(No Model.)

T. C. STEARNS.
METHOD OF AND APPARATUS FOR TESTING ACIDS.

No. 362,402. Patented May 3, 1887.

Witnesses.

Inventor:
Theron C. Stearns
By Justus M. St. John,
His Atty.

United States Patent Office.

THERON C. STEARNS, OF CEDAR RAPIDS, IOWA, ASSIGNOR TO ED. R. SHAW, OF SAME PLACE.

METHOD OF AND APPARATUS FOR TESTING ACIDS.

SPECIFICATION forming part of Letters Patent No. 362,402, dated May 3, 1887.

Application filed June 5, 1886. Serial No. 204,194. (No model.)

*To all whom it may concern:*

Be it known that I, THERON C. STEARNS, a citizen of the United States, residing at Cedar Rapids, in the county of Linn and State of Iowa, have invented certain new and useful Improvements in Methods of and Apparatus for Testing Acids, of which the following is a specification.

The object of my invention is to produce simpler, cheaper, and more accurate means for testing the relative quality of vinegars and other acids than those in common use; and the invention consists in the method and apparatus hereinafter described and claimed.

Figure 1:
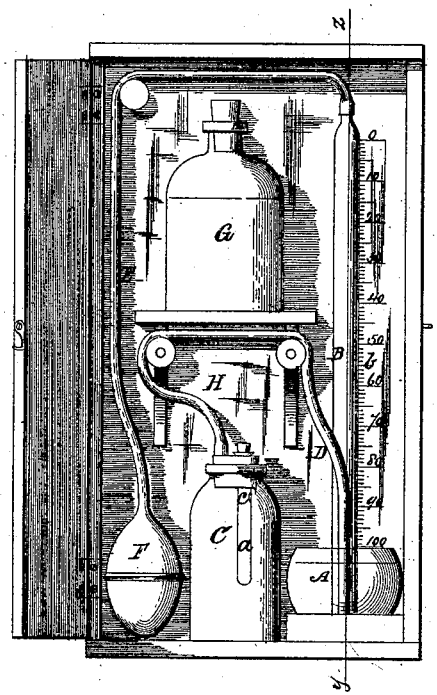
Figure 2:
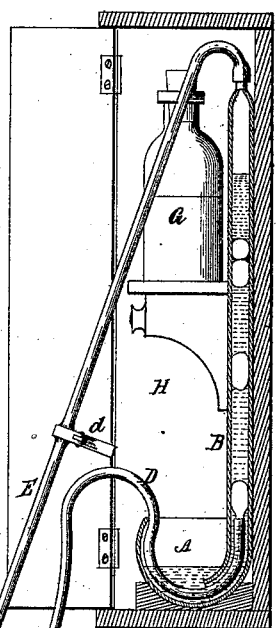

In the accompanying drawings, forming a part of this specification, Figure 1 represents a front elevation of the invention not in use; Fig. 2, a vertical section of the same as in use, on the line $y\ z$; and Fig. 3, a modified form of device for generating gas.

Similar letters of reference indicate corresponding parts.

The invention operates through the application of the familiar principle that the relative strength of different acids may be determined by the amount of carbonic-acid gas generated by a given quantity of the acid acted upon by an alkaline agent. Hitherto the amount of gas so generated has been measured by the quantity of water expelled by the gas from a close receptacle, and in all the devices for this purpose known to me the expulsion of the water is effected by the direct pressure of the gas. Commonly the gas is forced into a vertical graduated tube connecting with the cylinder holding the water, the value of the acid depending upon the height to which the water rises in the graduated tube. In the practical operation of this device more or less difficulty has been experienced, one of the most annoying of which is the tendency of the apparatus to leak—a circumstance due to the great pressure of the gas required to raise the column of water in the tube. Another serious objection to apparatus of this class is that they are necessarily quite expensive, great care being required in the construction of them. Still another, though less important, defect incident to all apparatus of this class operating according to the principle last above described is that in no case is the full amount of the gas generated represented in the tube, since enough will always remain in the generator to counterbalance the weight of the water in the tube. The amount of this residuum will of course depend upon the height of the column of water, which in turn depends upon the comparative purity of the acid, or, in other words, upon the amount of gas generated in the first instance. If the residuum were in all cases the same, no difficulty would be met with; but as it varies with the height of the water in the tube it is evident that this differentiation must be taken account of in the graduation of the tube in order to insure perfect accuracy in registration—a matter requiring nice calculation and great care.

My invention is designed to avoid all these objections, and this is effected by the application of a principle which I believe to be new as applied to this class of apparatus.

In my invention, instead of forcing the water out of one receptacle into another by physical pressure, the water is held in suspension by atmospheric pressure, and the displacement of water is made by introducing the carbonic-acid gas into the vacuum. This is accomplished in the following simple manner:

A is an open vessel, preferably of glass, adapted to hold any desired quantity of water. From near the bottom of this vessel, and preferably near the back side of it, a tube, B, also of glass, extends upward, as represented. This tube may be graduated, if desired; but in practice I prefer to mark the graduations on the frame or backing of the apparatus, it being cheaper than to mark them on the glass. The scale reads downward, and marks any desired divisions of one hundred. That part of the tube between 0 and 100 should hold a certain ascertained number of units of carbonic-acid gas generated from an ascertained quantity of chemically-pure acid decomposed by a sufficient amount of alkali. To the top of the tube is attached a flexible tube, E, preferably rubber, which may be furnished with a bulb, F, for the purpose of exhausting the air from the tube, or the same may be effected by the simple inspiration of the breath. By this means the water is raised to the zero-point in the tube, and is held at that point by sealing the upper outlet. This may be done by means of a simple spring-clamp, $d$, on the rubber tube by doubling the tube back upon itself by suitable valves, or in any other well-known way. A similar tube, D, enters the lower end of the tube B, which is enough larger than the former to allow the free passage of water between them. The opposite end of the tube D connects with a device for generating carbonic-acid gas, C. This device may be made in a great variety of ways; but for the purpose of this application two simple styles of apparatus are shown. That in Figs. 1 and 2 is a glass bottle or flask having a large neck, in which is fitted a cork or stopper. Near one side of the stopper is inserted a piece of tubing, $e$, adapted to connect tightly with the tube D. Near the opposite side of the stopper is fitted a test-tube, $a$, having a hole in one side below the stopper. It is also provided with a cork or stopper. This test-tube should hold precisely the same volume of acid up to the hole $c$ as was employed in determining the capacity of the vertical tube B.

G is a bottle containing a solution of bicarbonate of potash or other equivalent alkaline agent.

The operation of the invention is as follows: By exhausting the air in the tube D the water is raised to the zero-point thereon and supported at that point. A quantity of the alkaline solution is then poured into the receiver C, the amount not being important, except that it should be sufficient to neutralize the acid completely. The test-tube is now filled up to the hole, and with its connecting-stopper inserted in the receiver. The test-tube being tightly corked and the tube D connected with the receiver, the latter is tipped over, as indicated in Fig. 2, when the acid escapes from the hole $c$, and, coming in contact with the alkaline solution, produces carbonic-acid gas in the usual way. This gas passes through the tube D, and ascends through the tube B in bubbles, disengaging a corresponding volume of water as it reaches the top. The point at which the water stands when all the gas has exhausted itself will mark the relative strength or value of the acid.

Figure 3:
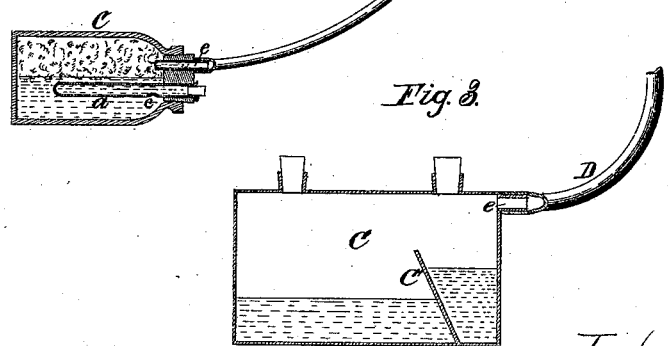

A still simpler form of receiver or generator is shown in Fig. 3. This is a mere box, C, made of tin or other suitable material, having two holes at the top fitted with stoppers, and an outlet, $e$, adapted to connect with the tube D. A partition, C', serves to separate the acid from the alkali until such time as it is desired to mix them, when this is effected by tipping the box.

For convenience and neatness in operation, the apparatus is preferably mounted in a box, H, which may be hung or otherwise fastened to the side of the room. This box is fitted for the reception of all the appliances used in the tests, and provided with a suitable door, as shown.

Besides the simplicity and cheapness of the invention, I regard it in other respects an improvement upon any apparatus hitherto devised for testing acids. In this apparatus there is practically no pressure of the gas in passing through the water, which is held in suspension by independent atmospheric pressure. Consequently the full volume of gas generated is represented in the tube, or practically the full volume. Whatever pressure there may be in the passage of the gas through the water, it is so slight as to be scarcely appreciable, and the natural result is that all grades of acid are subject to substantially the same conditions in the test. In consequence of this it is possible to graduate the scale uniformly from top to bottom. A further and more important advantage is that the nice adjustment and careful fitting necessary in the case of other apparatus is not required in this, and that the common tendency to leak is largely obviated and the tests rendered more accurate thereby.

Having thus described my invention, what I claim as new, and desire to secure by Letters Patent, is—

1. The described method of testing the relative values of acids, which consists in supporting a given volume of water by atmospheric pressure in a graduated tube or cylinder, and displacing said water by passing through it from below the carbonic-acid gas arising from the decomposition by alkali of a given volume of acid.

2. In an acidimeter, the combination of the receiver C, having separate compartments for acid and alkali, the gas-conduit D, communicating with the receiver and with the bottom of the tube B, graduated as specified, the water-receiver A, communicating with the tube B, as specified, and the exhaust-pipe E, all constructed, arranged, and adapted to operate substantially as set forth.

In testimony whereof I affix my signature in presence of two witnesses.

THERON C. STEARNS.

Witnesses:
FRANK G. CLARK,
S. LESLIE LECRON.